Oct. 18, 1966  L. R. J. BOURDALE  3,279,616
CARTRIDGE FILTER
Filed Oct. 28, 1963  2 Sheets-Sheet 1
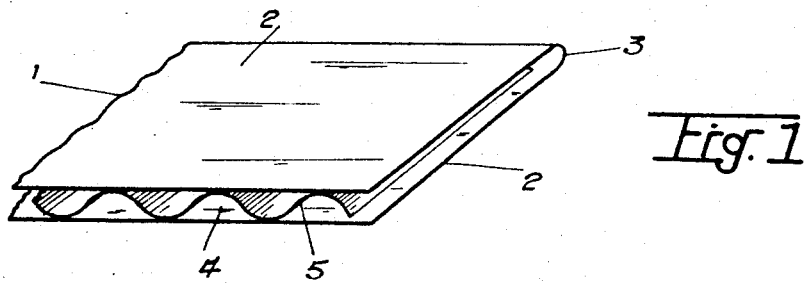
Fig. 1
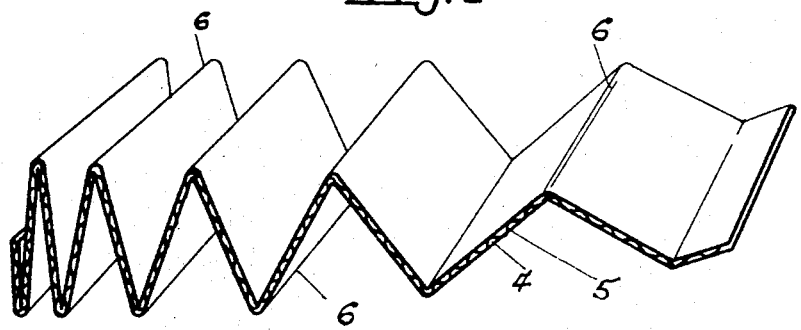
Fig. 2
Fig. 3
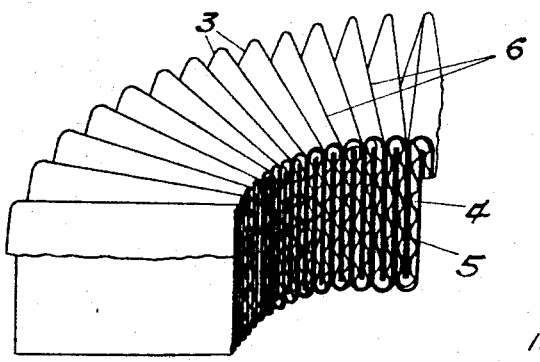
INVENTOR
LUCIEN RENE JUSTIN BOURDALE
BY
Woodhams, Blanchard and Flynn
ATTORNEYS Oct. 18, 1966  L. R. J. BOURDALE  3,279,616
CARTRIDGE FILTER
Filed Oct. 28, 1963  2 Sheets-Sheet 2
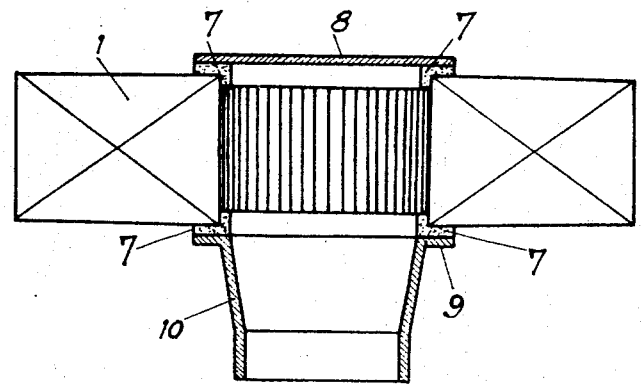
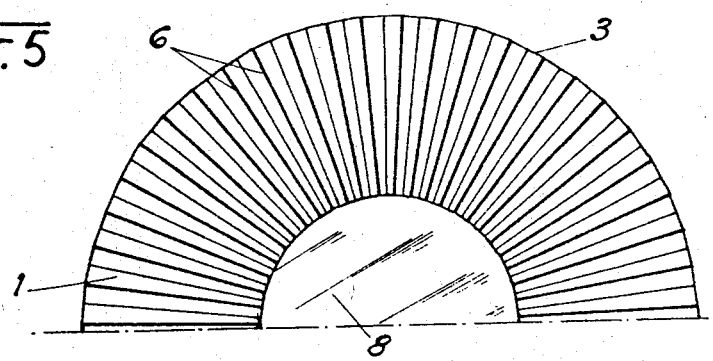
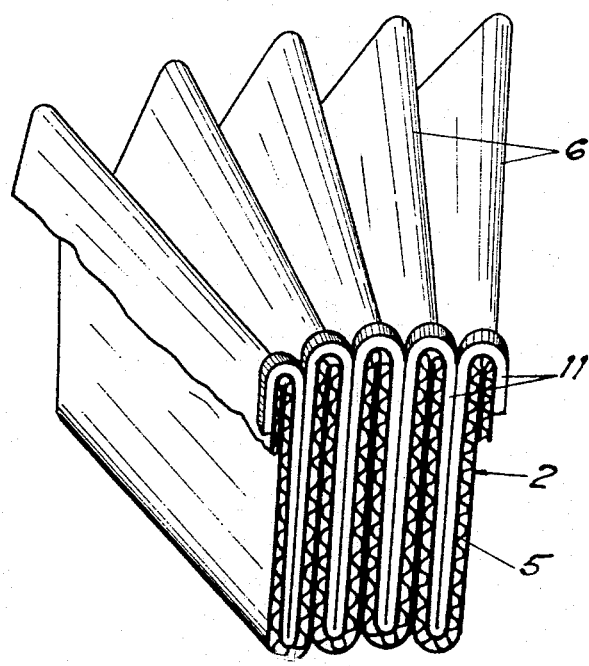
INVENTOR
LUCIEN RENE JUSTIN BOURDALE
BY
Woodhams, Blanchard & Flynn
ATTORNEYS

United States Patent Office 3,279,616
Patented Oct. 18, 1966

3,279,616
CARTRIDGE FILTER
Lucien René Justin Bourdalé, 30 Ave. Aristide Briand, Arpajon, France
Filed Oct. 28, 1963, Ser. No. 319,250
3 Claims. (Cl. 210—487)

The present invention relates to a cartridge filter which is intended to be immersed in the fluid to be filtered, of the type comprising a filter element having a generally annular shape, the inner face of which forms together with the two covers a vacuum tight chamber provided with means for connecting said chamber to a pipe branch for the discharge of the filtered fluid.

Cartridge filters of this type have already been produced in large quantities, both for the purpose of filtering gases and for the purpose of filtering liquids.

Many difficulties have nevertheless been encountered, and these have arisen either from the excessive cost price of filter elements or from the fact that said filter elements clog too rapidly with the resulting over frequent need to replace cartridges, or else from the fragile nature of cartridges which have hitherto been produced.

The object of the present invention is to overcome the disadvantages referred to above. Accordingly, a cartridge filter in accordance with the invention is essentially characterized in that the filter element consists of a continuous band having two separate filtering faces of small thickness which are mechanically supported on an intercalary strip which is either pleated, corrugated or fluted, one of the edges of said band remaining open while the other edge remains closed, said band being folded in bellows type pleats at right angles to the edges, then expanded into a fan shape so that those ends of the pleats which are located on the open edge are applied against each other and curved around an imaginary cylinder, said band having the requisite length to ensure that the two ends thereof meet along a generator line of said imaginary cylinder.

It will be understood that under these conditions those ends of the pleats which are on the same side as the closed edge, and which are therefore located on the outside of the annular element which is thus obtained, accordingly form in space a line of sinusoidal appearance located approximately on a second imaginary cylinder which is concentric with the first.

It will also be apparent that the fluid which surrounds the filter cartridge as thus constituted can reach the space formed within the inner cylinder only by passing through the filtering faces. The ring thus effectively constitutes a filter between the space formed outside the cartridge filter and the space formed within this latter. If the fluid is driven from the exterior towards the interior, the region located outside the cartridge is also located upstream of the filter while the other is located downstream. If the fluid follows a centrifugal path, the inner region of the cartridge accordingly becomes the region which is located upstream of the filter.

A cartridge filter as thus designed has a useful filtering area which is relatively substantial as compared with its volume by virtue of the two filtering faces of the band and by virtue of the radial bellows type pleats of said band as arranged in ring-shaped pattern.

In addition, the pleated, corrugated or fluted shape of the intercalary strip makes it possible to maintain circulation channels for the fluid which has passed through the filtering faces while also preventing these latter from sticking together by being applied against each other. Such a design provides in a given volume a useful filtering area which is approximately double the area provided by conventional arrangements.

Moreover, a cartridge filter in accordance with the invention has good mechanical strength by virtue of the intercalary strip which serves as a mechanical support for the filtering faces, thereby endowing said filtering faces with the sturdiness which these latter cannot have alone since they are necessarily thin in order to offer minimum flow resistance to the fluid. The said filter is also endowed with great strength by virtue of the mutual support provided by the pleats which are in contact with each other at the center of the cartridge.

Finally, a cartridge element of this type can be readily produced by automatic manufacturing processes by means of the new combination of known means which are already employed in the manufacture of corrugated board.

It is in fact very easy to devise a combined automatic machine which is supplied by a first reel with a continuous sheet of filtering material, by a second reel with a continuous sheet of intercalary material having a width which is one-half that of said filtering material, and finally which comprises means for applying liquid glue for the purpose of joining the filtering faces to said intercalary sheet.

At the commencement of operations, the intercalary sheet is passed between two grooved or fluted rolls which impart a pleated, corrugated or fluted shape thereto.

As the said intercalary sheet passes off the rolls, a gluing system spreads in adhesive product along the ridges of the pleats, corrugations or fluted portions, but only on one side of the intercalary sheet which is then positioned over a portion of the filtering sheet corresponding to one-half the width thereof, said filtering sheet being run off parallel to said intercalary sheet.

The band of filtering material is then applied against the filtering face and the assembly is then passed through a drying oven wherein the heat which polymerizes the adhesive binds the sheets together at the glued summits of the ridges.

As the next step, those summits of the intercalary sheet which are located on the opposite side are in turn provided with a coating of adhesive, whereupon the second half of the filtering wall is folded longitudinally over said opposite side and applied against said summits.

After processing through a drying oven and after the adhesive coating formed on the second summits of the intercalary sheet has accordingly been polymerized, the resulting assembly passes out in a continuous flat band having two filtering faces. The flat band thus formed then passes between two alternately disposed dies which are set at a distance from each other which corresponds to the depth of a single flattened pleat, said dies being designed to produce an indentation on each side of said band so as to form the bellows-type pleats of the cartridge filter in accordance with design requirements.

By means of a cutting blade which is fitted at the output end of the machine, the pleated band thus formed is finally delivered in cut sections containing the exact number of pleats which is necessary for the fabrication of the annular cartridge filter.

A clear understanding of the present invention will in any case be gained from the description which follows below, reference being made to the accompanying drawings in which one form of embodiment of the invention is shown solely by way of non-limitative example, and in which:

FIG. 1 is a perspective view on a larger scale showing a portion of continuous band employed for the purpose of forming the filter element of the cartridge.

FIG. 2 shows the same continuous band on a smaller scale after said band has been folded so as to form bellows-type pleats.

FIG. 3 shows the same continuous band in a later stage of fabrication of the filter element.

FIG. 4 is a sectional view of a filter element which is fitted between its two covers so as to form a cartridge filter.

FIG. 5 is a view in half elevation of the cartridge filter which has thus been formed.

FIG. 6 shows an alternative form of filter element.

If reference is first made to FIG. 1, it can be seen that this latter illustrates a continuous band which is designated by the general reference 1 and which comprises two filtering faces 2, a closed edge 3 and an open edge 4; there has been placed between the two filtering faces a corrugated intercalary sheet 5 which is glued to the faces 2 along the top and bottom generator lines, the closed face being simply formed by folding the continuous sheet which forms the two faces 2.

By way of example, a continuous band of this type has been formed in the manner which has been indicated above by a machine which first carries out the gluing of the intercalary sheet 5 to the bottom face of the filtering sheet 2 and then carries out the folding of the continuous sheet at 3 in such a manner that the top face of said filtering sheet 2 is glued along the upper generator lines of the intercalary sheet 5.

The same machine then carries out by means which are known per se the formation of transverse pleates 6 in alternate directions, following which it is merely necessary to brake the forward progression of the continuous band thus formed in order to result in a bellow type element having pleats which are progressively set closer together.

When the different faces of said pleated bellows have been brought into contact, the band is cut off to the desired length and the two ends of the pleated element thus formed are brought round and juxtaposed so as to form a ring as has been partially shown in FIG. 3, wherein the open edges 4 which are now contiguous can be distinguished, whilst the pleates 6 extend radially along the top face and along the bottom face of the element and the closed edges 3 form bellows-type pleates on the outer face of said element.

The assembly of the cartridge filter is then completed in the manner which is shown in FIG. 4 by providing the filter element which is thus formed with sealing means 7 of any appropriate design, also with a simple cover plate 8 on the one hand and a cover element 9 on the other hand, said cover element 9 comprising a connecting piece 10 which is designed to be coupled to a discharge pipe (not shown).

There is thus provided a cartridge filter which is intended to be immersed in a fluid to be filtered which, by creating a partial vacuum, will be induced to flow through all the filtering faces of the element, then to circulate within the channels formed by the pleated intercalary sheet so as to reach the open edge of said element on the inner face of the cartridge and then to be discharged from that point through the connector pipe 10.

In the alternative form which is illustrated in FIG. 6, there has been glued along the open edge of the band 1 a fluid-tight border 11 which can in certain cases prove useful either for the purpose of ensuring leak tightness or for the purpose of reducing the number of pleats required in order to produce a cartridge.

It will in any case be readily understood that the form of embodiment of the invention which has just been described has been given solely by way of non-limitative example and that a large number of modifications can be made therein without consequently departing either from the scope or the spirit of the invention. For example, it would thus be possible to produce units of large size by constructing a cartridge of a number of sectors which are secured to a sufficiently strong and rigid support, or alternatively to replace the single continuous folded sheet by two continuous sheets which are joined together by any sealing means for the purpose of forming the closed edge, or alternatively to make use of an intercalary element other than that which has been illustrated, or else to form very large filtering surfaces by superposing a number of cartridges on a same fictitious inner tube, or as a further modification to make provision for mechanical protection means which surround said cartridge elements or assemblies of superposed cartirdge elements.

What I claim is:

1. A cartridge filter of the type which is intended to be immersed in the fluid to be filtered, comprising:
   a filter element comprising two elongated faces of filtering material of small thickness, a furrowed intercalary strip interposed between and supporting said filtering material faces and defining therewith a series of ducts which extend between the outer side edges of said faces and the inner side edges of said faces, the space between said outer side edges of said faces being closed and the space between said inner side edges of said faecs being open whereby fluid can flow through said ducts and through the space between said inner side edges;
   the filter element being folded about fold lines extending between said side edges so that the filter element is divided into hingedly connected sections which alternately extend in opposite directions in a generally zig-zag fashion;
   the filter element being folded, curved and positioned so that said inner side edges of each of said sections are substantially parallel to each other and to the inner side edges of the adjacent sections and form a cylindrical opening, the inner side edges of each section being in continuous, fluid-sealing engagement with the corresponding parallel inner side edges of the adjacent sections between the fold lines whereby fluid flow between said sections into said cylindrical opening is prevented;
   the filter element forming substantially an annulus of substantial depth consisting of a single layer of the filter element;
   a pair of covers secured to the opposite ends of said filter element adjacent said fold lines and overlying opposite ends of said cylindrical opening, at least one of said covers having conduit means associated therewith in fluid-flow communication with said cylindrical opening;
   said ducts being in fluid-flow communication with said cylindrical opening.

2. Cartridge filter as claimed in claim 1, wherein the filter element is provided with a sealing border along said inner side edge thereof.

3. A cartridge filter of the type which is intended to be immersed in the fluid to be filtered, comprising:
   a filter element consisting of two elongated faces of filtering material having corresponding first and second opposite side edges, interior surfaces facing each other and exterior surfaces facing away from each other; a one-piece, elongated, furrowed, intercalary strip disposed between said filtering material faces and separating same from each other a selected distance, the furrows extending between said side edges and the respective surfaces of said intercalary strip contacting and being secured to said filtering material faces at spaced zones therealong and being spaced therefrom between said zones, said zones extending from adjacent corresponding first side edges of said filtering material faces to adjacent the corresponding second side edges thereof to define ducts which extend from said first corresponding edges of said filtering material faces to said second corresponding edges thereof whereby fluid can pass through the filtering material faces and into the ducts; fluid tight means closing the space between the filtering material faces along said first corresponding edges thereof, the filter element being open along said second corresponding side edges of said faces so that fluid can flow from the ducts to and through the open side of said filter element;

said filter element being folded at regularly spaced intervals alternately in opposite directions at fold lines which extend between and at right angles to said side edges of said filter element so that the filter element is formed into hingedly connected sections which alternately extend in opposite substantially parallel directions in a generally zig-zag fashion;

the filter element being folded, curved and positioned so that said second corresponding edges of each of said sections are substantially parallel with each other and with the corresponding second edges of the adjacent sections and form a cylindrical opening, the second edges of each section being in snug continuous fluid-sealing engagement with the corresponding parallel second edges of the adjacent sections between the fold lines whereby fluid flow is prevented between said sections into said cylindrical opening;

the filter element forming substantially an annulus of substantial depth consisting of a single layer of the filter element;

a pair of covers sealingly secured to the opposite ends of said filter element and overlying opposite ends of said cylindrical opening, at least one of said covers having conduit means associated therewith so that fluid entering said cylindrical opening can be removed through said conduit means;

said ducts being in free communication with said cylindrical opening.

References Cited by the Examiner

UNITED STATES PATENTS

| | | | |
|---|---|---|---|
| 2,383,066 | 8/1945 | McDermott | 210—493 X |
| 2,457,958 | 1/1949 | Walker | 210—493 |
| 2,663,660 | 12/1953 | Layte | 210—483 X |
| 2,730,241 | 1/1956 | Thomas. | |
| 2,897,971 | 8/1959 | Gewiss | 210—487 X |

FOREIGN PATENTS

| | | |
|---|---|---|
| 1,222,727 | 1/1960 | France. |
| 909,892 | 11/1962 | Great Britain. |
| 912,517 | 12/1962 | Great Britain. |
| 315,839 | 3/1934 | Italy. |

REUBEN FRIEDMAN, *Primary Examiner.*

D. M. RIESS, *Assistant Examiner.*